(12) United States Patent
Petrovic (10) Patent No.: US 9,758,318 B2
(45) Date of Patent: Sep. 12, 2017

(54) METHOD AND SYSTEM FOR TRANSFERRING OBJECTS

(71) Applicant: GEBO PACKAGING SOLUTIONS FRANCE, Reichstett (FR)

(72) Inventor: Zmaj Petrovic, Mundolsheim (FR)

(73) Assignee: GEBO PACKAGING SOLUTIONS FRANCE, Reichstett (FR)

( * ) Notice: Subject to any disclaimer, the term of this patent is extended or adjusted under 35 U.S.C. 154(b) by 0 days.

(21) Appl. No.: 14/779,733

(22) PCT Filed: Mar. 24, 2014

(86) PCT No.: PCT/EP2014/055792
§ 371 (c)(1),
(2) Date: Sep. 24, 2015

(87) PCT Pub. No.: WO2014/154608
PCT Pub. Date: Oct. 2, 2014

(65) Prior Publication Data
US 2016/0052727 A1 Feb. 25, 2016

(30) Foreign Application Priority Data

Mar. 25, 2013 (FR) ...................................... 13 52628

(51) Int. Cl.
*B65G 47/53* (2006.01)
*B65G 47/44* (2006.01)
(Continued)

(52) U.S. Cl.
CPC ............. *B65G 47/53* (2013.01); *B65G 47/06* (2013.01); *B65G 47/44* (2013.01); *B65G 47/682* (2013.01); *B65G 2201/0244* (2013.01)

(58) Field of Classification Search
CPC ........ B65G 47/06; B65G 47/34; B65G 47/44; B65G 47/68; B65G 47/69; B65G 2201/0244; B65G 47/682; B65G 47/53
(Continued)

(56) References Cited

U.S. PATENT DOCUMENTS 2,037,623 A * 4/1936 Forster .................... C03B 35/06
198/409
3,557,932 A * 1/1971 Laub, III .................. B08B 6/00
198/433
(Continued)

FOREIGN PATENT DOCUMENTS

CN          1193595 A      9/1998
DK          EP 1886946 A1 *  2/2008 ......... B65G 47/2445
(Continued)

OTHER PUBLICATIONS

International Search Report, dated Apr. 29, 2014, from corresponding PCT application.
(Continued)

*Primary Examiner* — Mark A Deuble
(74) *Attorney, Agent, or Firm* — Young & Thompson (57) ABSTRACT

A method for transferring at least one object (7) from a conveying surface (9) of a supply conveyor (6) onto a surface (15), the method including the following steps: —conveying the object (7) in a conveying direction, the object (7) including a base (7a) that rests on the conveying surface (9), —bringing the object (7) into contact with a guide (16) placed in the conveying direction at a distance from the downstream end line (12) of the supply conveyor (6), —ending the contact between the base (7a) of the object and the conveying surface (9), —dropping the object (7) onto the receiving surface (15), the step of ending the contact between the base (7a) of the object (7) and the
(Continued)

conveying surface (9) only taking place after the step of bringing the object (7) into contact with the guide (16).

20 Claims, 9 Drawing Sheets

(51) Int. Cl.
  *B65G 47/06* (2006.01)
  *B65G 47/68* (2006.01)
(58) Field of Classification Search
  USPC .................. 198/347.4, 418.6, 433, 836.1
  See application file for complete search history.

(56) References Cited

U.S. PATENT DOCUMENTS

| | | | | |
|---|---|---|---|---|
| 3,610,399 | A * | 10/1971 | Friedrich | B65G 47/256 198/398 |
| 4,257,516 | A * | 3/1981 | Ionescu | B65G 47/24 198/399 |
| 4,463,846 | A * | 8/1984 | Ionescu | B65G 47/24 198/399 |
| 5,040,662 | A * | 8/1991 | Clark | B65G 47/846 198/408 |
| 5,308,001 | A * | 5/1994 | Grecksch | D01H 9/187 198/347.4 |
| 6,202,827 | B1 * | 3/2001 | Drewitz | B65G 47/082 198/433 |
| 2003/0010682 | A1 * | 1/2003 | Linton | B07C 5/3408 209/524 |
| 2007/0045083 | A1 * | 3/2007 | Hart | B65G 47/52 198/418.6 |
| 2008/0149462 | A1 * | 6/2008 | Cholet | A24C 5/322 198/524 |
| 2012/0279828 | A1 | 11/2012 | Eschlbeck | |

FOREIGN PATENT DOCUMENTS

| | | |
|---|---|---|
| EP | 1 717 533 A2 | 11/2006 |
| EP | 2 520 521 A1 | 11/2012 |
| JP | S52 134977 U | 10/1977 |
| JP | H11 301 841 A | 11/1999 |

OTHER PUBLICATIONS

Chinese Office Action, dated Sep. 1, 2016, from corresponding Chinese application No. 201480021882.8.

* cited by examiner

METHOD AND SYSTEM FOR TRANSFERRING OBJECTS

FIELD OF THE INVENTION

The invention relates to the field of systems and methods for transferring conveyed objects, and in particular the systems for transferring between two conveyors, particularly to transfer objects arranged in a row.

The invention relates particularly to the transferring of objects of the bottle or carton type, having dimensions such that they are easily destabilized, between two conveyors having conveying directions that are approximately perpendicular.

STATE OF THE ART

In the field of conveying, the transferring of objects from an accumulator to an output conveyor raises several problems. The main problems encountered will be presented here using an example of the state of the art.

Figure 1:
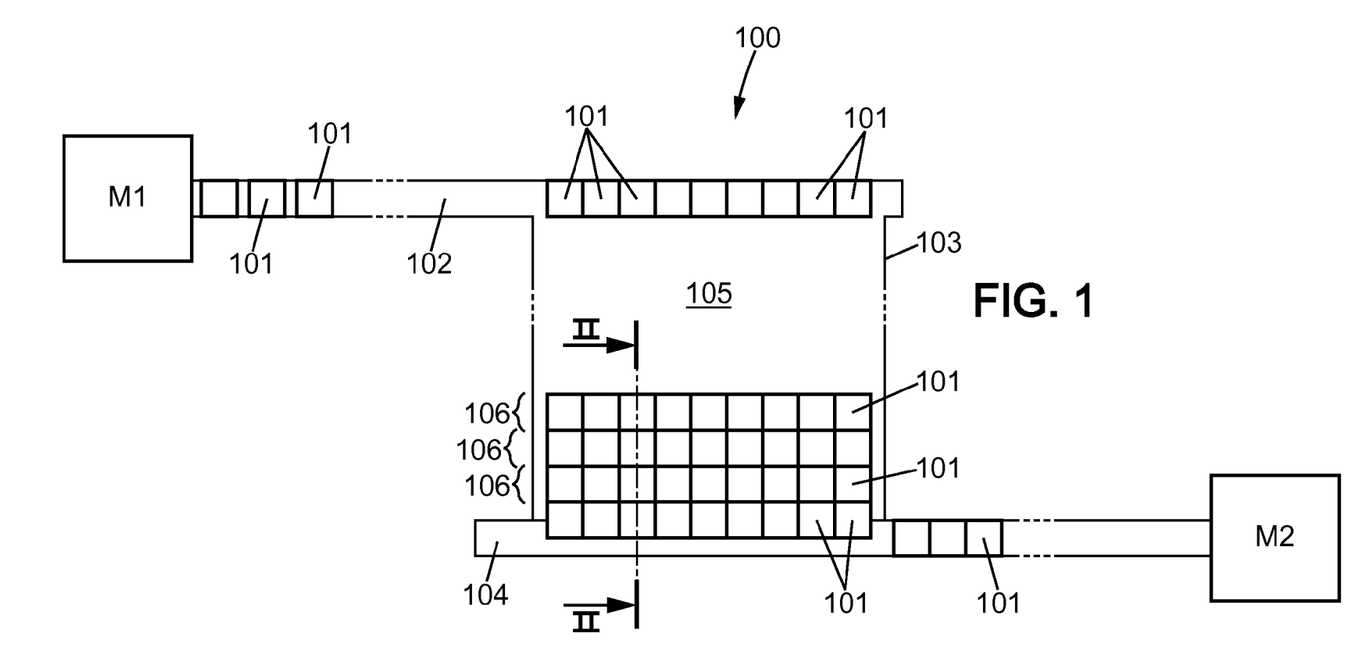
FIG. 1 is a diagrammatic representation, seen from above, of an accumulator between two machines according to the state of the art, a system for transferring between the accumulator and an output conveyor according to the state of the art being put into place.

Shown in FIG. 1 is a line 100 for processing objects 101, for example bottles, comprising successively an upstream machine M1, for example a labeler of bottles, a one-line input conveyor 102, an accumulator 103, a one-line output conveyor 104, and a downstream machine M2, for example a bundler. The input conveyor 102 brings the bottles 101 onto an accumulation surface 105 of the accumulator 103. The bottles 101 can then be stored temporarily in case, for example, of failure of the downstream machine M2.

The bottles 101 are stored in rows 106 on the accumulation surface 105. The length of the rows 106 depends in particular on the production rates, on the width of the objects 101, and on the cycle time of the accumulator 103 to create a row 106 from the input conveyor 102 on the accumulation surface 105 and to collect the next row 106 on the input conveyor 102.

Thus, for example, when the production rate is 30,000 objects per hour, for carton-type objects of small capacity, about 20 mL (milliliters), 50 mm (millimeters) wide, the input and output conveying speed is about 0.4 m/s (meters per second). Thus, for a cycle time of 5 s (seconds), the width of the row must be about 2 m (meters).

In another application for bottle-type objects of larger capacity, about 1.5 L (liters), 110 mm wide, the rate often approaches 80,000 objects per hour. The conveying speed is about 2.5 m/s. For the same cycle time of 5 s, the length of the row on the accumulation surface must therefore be about 12.5 m.

Consequently, for bottle-type objects, not only are the conveying speeds high, but also the length of the rows on the accumulation surface 105 is considerable.

Figure 2:
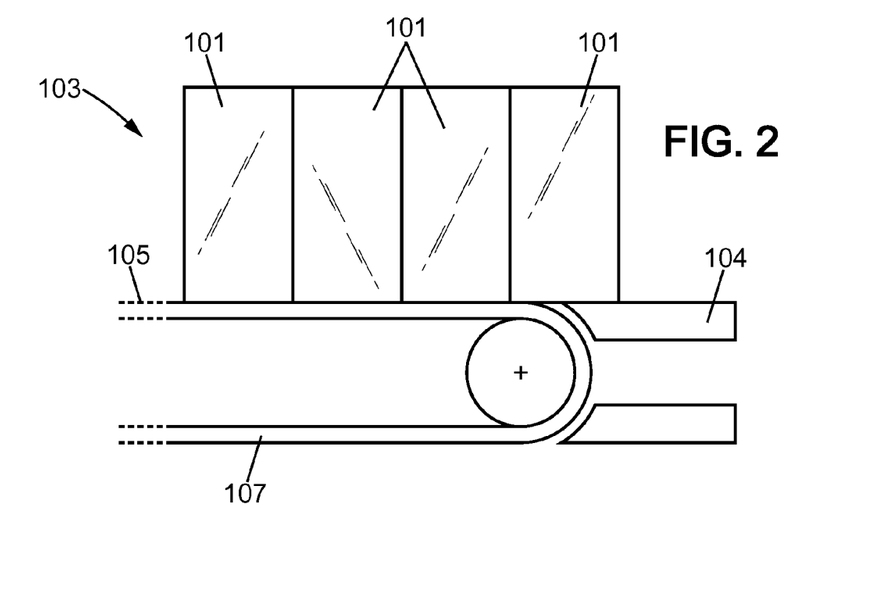
FIG. 2 is a cutaway view of FIG. 1 along the line II-II illustrating the detail of the transferring system.

To transfer the objects 101 from the accumulation surface 105 to the output conveyor 104, the accumulation surface 105, is, for example, carried by a conveyor 107 whose conveying direction is approximately perpendicular to the conveying direction of the input and output conveyors 102, 104. The accumulation surface 105 is approximately coplanar with the conveying surface of the output conveyor 104. The rows 106 of objects are in contact with one another on the accumulation surface 105.

When the conveyor 107 of the accumulator 103 is put into operation, the row 106 that is farthest downstream on the conveyor 107 of the accumulator 103 is pushed onto the output conveyor 104 by the rows 106 that follow it.

A two-fold problem then presents itself.

First of all, the dimensions of the bottles 101, which are objects whose height is the largest of their dimensions, make unstable objects; i.e., they can topple over more easily as a result of jolts for example, but must, however, be conveyed at speeds higher than those of carton-type objects that are more stable because they are shorter. Thus, during the transfer between the accumulator 103 and the output conveyor 104, the bottles 101 can topple over.

In addition, in the case of bottles 101 made of thermoplastic materials, they are compressible objects, such that the bottles 101 between two successive rows 106 are not precisely aligned in the direction of conveying on the accumulation surface 105. This deviation can prove to be considerable relative to the width of the bottles, typically between 5 and 10 cm (centimeters). This offsetting occurs mainly at the downstream end 108, in the direction of conveying of the input conveyor 102, of the rows 106. Thus, when a row 106 pushes on another row 106 to be transferred, the forces exerted on the bottle 101 at the downstream end 108 of the row 106 to be transferred are not uniform on the bottle 101, which starts to pivot, indeed to topple over.

The disarray caused by the pivoting and/or the toppling-over of this single bottle 101 can have an impact on the adjacent bottles 101 of the row 106, indeed also on the bottles of the following rows 106 on the accumulation surface 105. The bottles are therefore no longer arranged in a row when they are transferred onto the output conveyor 104, which can cause blocking of the conveyors 102, 104, 107.

Moreover, regardless of the type of objects to be transferred, it is always necessary to have at least one row on the accumulation surface, and preferably two rows, which push(es) on the row to be transferred, so that the force exerted by the upstream rows is enough to move the row to be transferred onto the output conveyor.

Thus, it is not possible to empty the accumulator completely, and outside intervention is required to remove the last rows.

Although these problems exist in particular for the transfer at the accumulator output, they can also be found during any transfer between two conveyors.

Consequently, there is a need for a new transferring device that overcomes in particular the above-cited drawbacks.

OBJECT AND SUMMARY OF THE INVENTION

A first object of this invention is therefore to propose a transferring device that guarantees a continuous transferring of objects from a supply conveyor, such as the conveyor of an accumulator, to a receiving surface, for example of an output conveyor, independently of the number of objects present on the supply conveyor.

A second object of the invention is to propose a transferring device that makes it possible to maintain the orientation of the objects during the transfer.

A third object of the invention is to propose a transferring device that makes it possible to maintain the rows of objects during the transfer.

A fourth object of the invention is to propose a transferring device that limits costs.

According to a first aspect, the invention relates to a method for transferring at least one object from a conveying surface of a supply conveyor to a receiving surface adjacent to a downstream end line of the supply conveyor in the direction of conveying. The receiving surface is offset from the conveying surface downward in a vertical direction. The method then comprises the following steps:

the conveying of the object in a conveying direction, the object having a base that rests on the conveying surface, putting the object into contact with a guide placed in the direction of conveying at some distance from the downstream end line of the supply conveyor, ending the contact between the base of the object and the conveying surface, dropping the object onto the receiving surface.

The step for ending the contact between the base of the object and the conveying surface takes place only after the step for putting the object into contact with the guide.

Preferably, during the step for ending the contact between the base of the object and the conveying surface and during the step for dropping the object onto the receiving surface, the contact between the object and the guide is maintained.

The method can further comprise a step for removing the object from the receiving surface. For example, the receiving surface is carried by an output conveyor, the output conveyor being at rest when receiving the object on the receiving surface, and then being in operation during the removal of the object. As a variant, the receiving surface is carried by an output conveyor, the output conveyor being in operation when receiving the object on the receiving surface.

According to one embodiment, the method comprises a step for destabilizing the object on the conveying surface before the step for ensuring contact with the guide, the guide being placed such that, when the object is put into contact with the guide, the guide is above a center of gravity of the object.

The method can be used for a row of objects, the row extending in a transverse direction, perpendicular to the direction of conveying of the supply conveyor. The steps of the method are then advantageously performed simultaneously for all of the objects of the row.

In this case, several rows can be placed on the conveying surface of the supply conveyor. The distance between the rows is determined so that the step for dropping a row of objects takes place only after a step for removal of the row of objects previously transferred onto the receiving surface.

According to a second aspect, the invention relates to a system for transferring at least one object from a conveying surface onto a receiving surface according to the method as presented above. The system comprises a supply conveyor carrying the conveying surface, the object resting on a base on the conveying surface. The conveying surface has a main portion that extends in a direction of conveying, and an inclined portion, in the extension downstream from the main portion in the direction of conveying, the inclined portion being inclined in relation to the direction of conveying, downward in a vertical direction. The receiving surface is adjacent in the conveying direction to a downstream end line of the supply conveyor, the object being able to rest by its base on the receiving surface.

In addition, the receiving surface is offset from the conveying surface downward in the vertical direction.

The transferring device further comprises:
at least one guide, located at some distance in the direction of conveying from the end line of the supply conveyor, the receiving surface then extending at least partially in the longitudinal direction between the end line and the guide,
means for adjusting the distance between the guide and the downstream end line of the supply conveyor and means for adjusting the position of the receiving surface in relation to the main portion of the conveying surface so that the transferring system is able to implement the method as presented above.

According to an example of application, the receiving surface is carried by an output conveyor whose conveying direction is perpendicular to the direction of conveying of the supply conveyor.

According to a particular embodiment, the guide comprises two portions, a first portion being located above the center of gravity of the object when the object rests on the conveying surface and a second portion being located closer to the receiving surface in the vertical direction than the first portion.

Advantageously, the supply conveyor is able to convey at least one row of objects that extends in a transverse direction to the direction of conveying, onto the receiving surface. The guide then extends in the transverse direction, along a dimension corresponding at least to the transverse length of the at least one row of objects.

According to an example of application, the supply conveyor is a conveyor of an accumulator between an input conveyor conveying objects at the output of an upstream machine and an output conveyor conveying objects up to the input of a downstream machine.

For example, the supply conveyor can be an endless belt conveyor that winds around at least one downstream drum carrying the downstream end line of the supply conveyor.

BRIEF DESCRIPTION OF THE DRAWINGS

Other objects and advantages will be brought out from the description given below with reference to the accompanying drawings, in which.

DETAILED DESCRIPTION

Figure 3A:
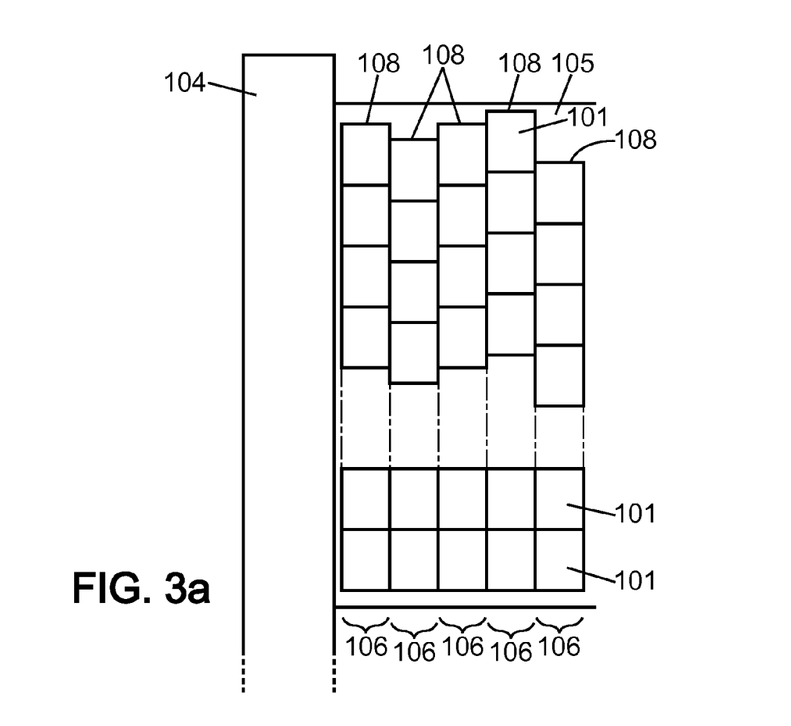
FIGS. 3a to 3c are diagrammatic representations, seen from above, respectively of four steps for transferring objects of hexagonal shape according to the state of the art.
Figure 3B:
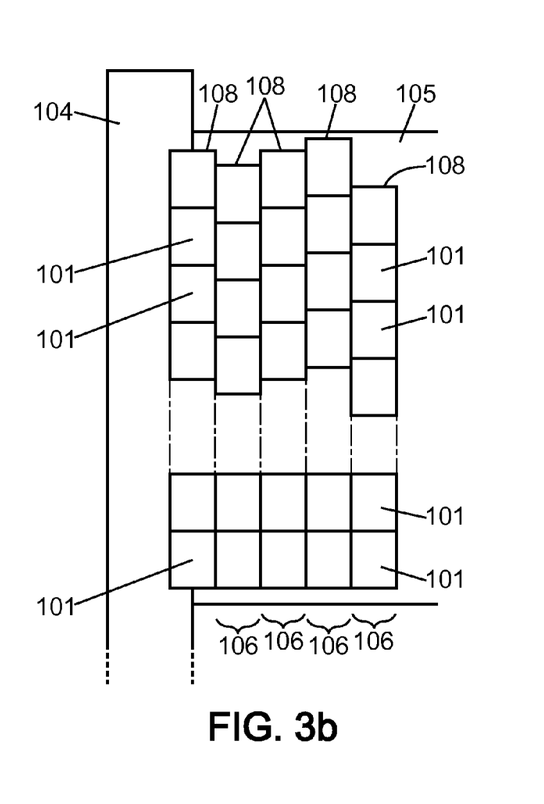
Figure 3C:
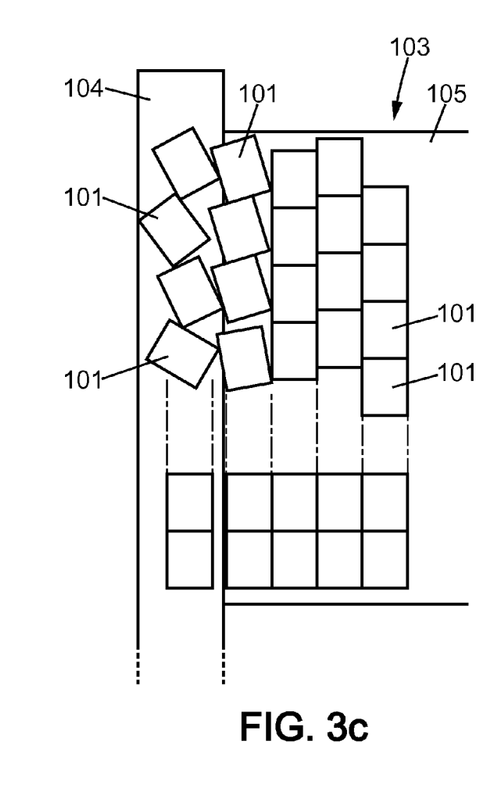

FIGS. 1 to 3 have already been described in the introduction and illustrate one embodiment comprising numerous drawbacks compared to the system described below.

Figure 4:
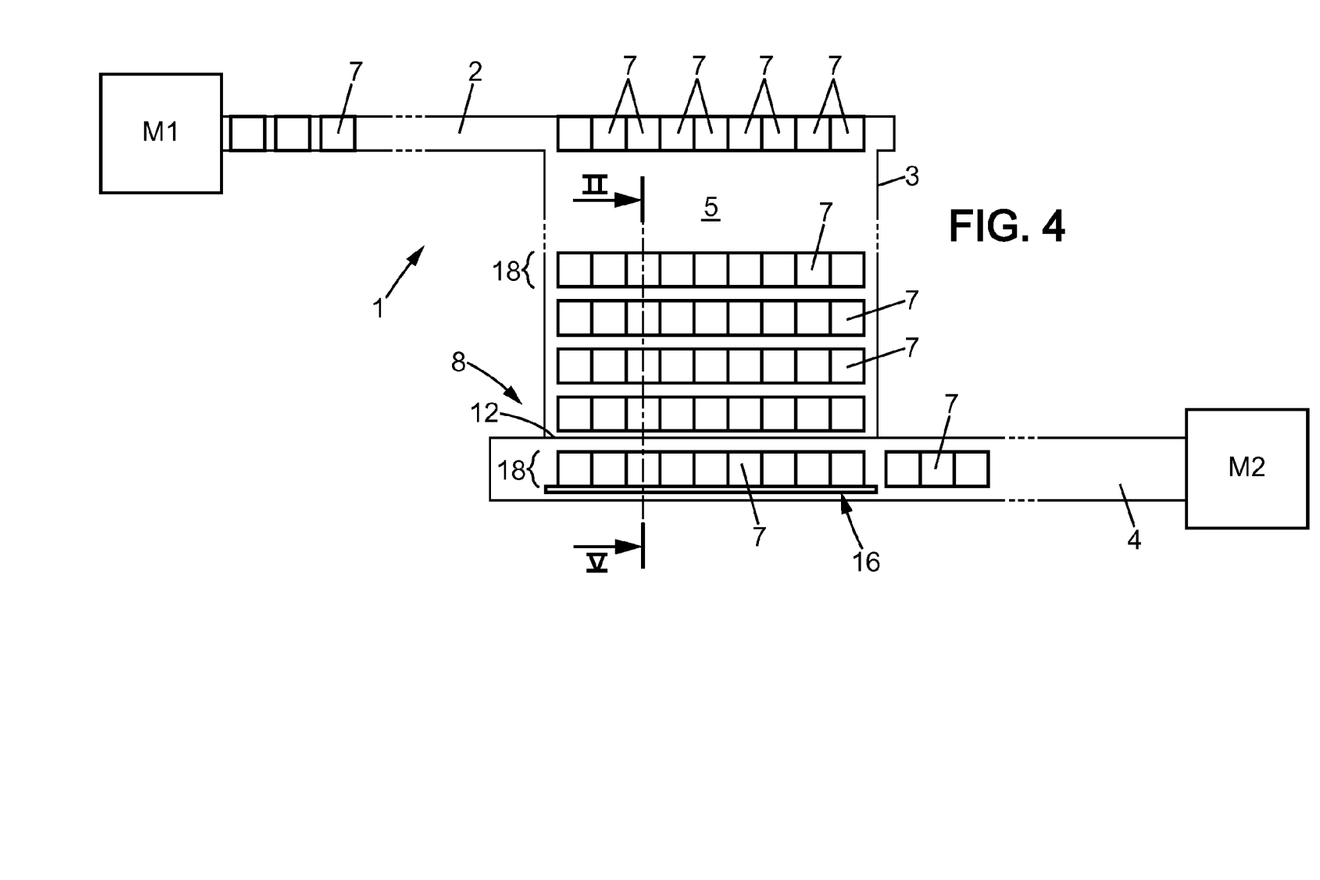
FIG. 4 is a diagrammatic representation, seen from above, of an accumulator between two machines that comprise a transferring system according to an embodiment of the invention.
Figure 5:
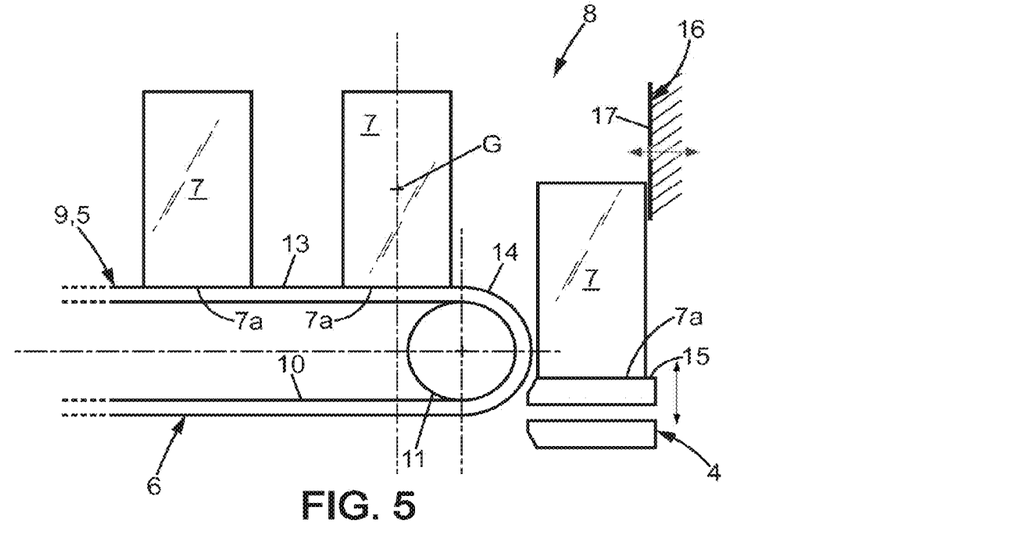
FIG. 5 is a cutaway view of FIG. 4 along the line V-V.

In FIG. 4, represented in top view is a part of a line 1 for processing objects 7, between an upstream machine M1 and a downstream machine M2.

An input conveyor 2 extends between the upstream machine M1 and an accumulator 3; an output conveyor 4 extends between the accumulator 3 and the downstream machine M2.

For example, the input conveyor 2 and the output conveyor 4 are single-line conveyors, and both advance in the same direction, at the same speed of conveying.

The accumulator 3 comprises an accumulation surface 5, carried by a conveyor, which is also called supply conveyor 6 below.

Objects 7 arrive in line on the input conveyor 2 and enter the accumulator, where they are placed in a row. Means, not shown here, make it possible to ensure the transfer from the input conveyor 2 onto the accumulation surface 5.

The line incorporates a system 8 for transferring objects 7 between, according to the example described in reference to the figures, the accumulator 3 and the output conveyor 4.

More specifically, the transferring system comprises a conveying surface 9, carried by the supply conveyor 6. The supply conveyor 6 defines a conveying direction that comprises at least one component in a longitudinal horizontal direction.

Here, the base 7a of the object 7 refers to the portion of the object in contact with a surface on which the object 7 rests balancing under the effect of its weight. Thus, the base 7a can in practice be a face of the object 7 but also several faces or several points of the object 7.

In addition, below, the terms "above," "on," "vertical," "horizontal," and "down" will be taken in reference to the natural orientation of FIGS. 5 to 14, which are in a vertical plane, parallel to the direction of conveying, and in which the objects rest under the effect of their weight on the conveying surface 9, which comprises a horizontal portion.

According to the example of the figures, the conveying surface 9 of the supply conveyor 6 is embodied by an endless belt 10 that is wound around a drum 11. The supply conveyor 6 can nevertheless be any type of conveyor, for example with chains or with rollers. The supply conveyor 6 has a downstream end line 12, i.e., the line beyond which, in the direction of conveying, the object can no longer be in contact with the supply conveyor 6.

The conveying surface 9 comprises a main first portion 13 that extends in the direction of conveying, which is horizontal in the example of FIGS. 5 to 14, and an inclined portion 14, in the downstream extension of the main portion 13 in the direction of conveying. The inclined portion 14 is inclined downward in relation to the direction of conveying.

Thus, the objects 7 can rest on the conveying surface by their base 7a. In other words, the conveying surface has an incline and friction characteristics such that the objects resting above do not fall, but remain balanced on their base and stationary in relation to the conveying surface.

Referred to here as "inclined" is the characteristic according to which the directing vector of the inclined portion 14 is not perpendicular to the direction of conveying. As is the case in the figures, the inclined portion 14 can be a curved portion, carried by the drum 11, the directing vector then not being constant.

The transferring system 8 comprises in addition a receiving surface 15. The receiving surface 15 is offset from the main portion 13 downward in the vertical direction. More specifically, this offsetting is measured between a point located at the junction between the main portion 13 and the inclined portion 14 of the conveying surface 9.

Furthermore, the receiving surface 15 is adjacent, in the direction of conveying, to the downstream end line 12 of the supply conveyor 6. Thus, the object 7 moving in the direction of conveying and going beyond the end line 12 can come onto the receiving surface 15. In other words, the downstream end line 12 represents the line of the supply conveyor 6 that is the farthest downstream and that is located above the receiving surface 15. In FIGS. 5 to 14, the downstream end line 12 is merged with the return line from which the endless belt 10 of the supply conveyor 6 moves in the direction opposite the direction of conveying. However, depending on the offsetting between the receiving surface 15 and the main portion 13 of the conveying surface 9, the downstream end line 12 can be located above the return line. However, it cannot be located below, because the object cannot rest on the portion of the belt 10 that is moving in the direction opposite the direction of conveying.

According to the example of FIGS. 5 to 14, the receiving surface 15 is carried by the output conveyor 4 and is horizontal.

To go from the conveying surface 9 to the receiving surface 15, the object 7 then drops under the effect of its weight.

The transferring system 8 finally comprises at least one guide 16, located at some distance from the end line 12 of the supply conveyor 6 in the direction of conveying, so that the receiving surface 15 extends at least partially between the end line 12 and the guide 16.

The guide 16 presents itself, for example, in the form of a plate having a front face 17, which extends in a vertical plane, which is parallel, and which faces the downstream end line 12 of the supply conveyor 6. Alternatively, the guide 16 can comprise a plurality of plates, the front face 17 being formed in a non-continuous manner. Also alternatively, the guide 16 can be a bar, the front face being reduced to a line.

The objects 7 for which this transferring system 8 is particularly well suited are so-called unstable objects, i.e., which can easily topple over when they are moved away from their balance position resting on their base 7a. In other words, these are objects 7 that have a height, i.e., the dimension in a direction that is perpendicular to their base, greater than their other dimensions. The distribution of the mass of the object 7 is approximately uniform over the height of the object.

According to a preferred embodiment, the receiving surface 15 is carried by the output conveyor 4, whose conveying direction is perpendicular to the direction of conveying of the supply conveyor 6.

Thanks to the transferring system 8, it is possible to transfer said objects 7 from the conveying surface 9 of the supply conveyor 6 to the receiving surface 15, the objects 7 resting by their base 7a both on the conveying surface 9 before transfer and on the receiving surface 15 after transfer.

Thus, the method for transferring the objects 7 from the conveying surface 9 of the supply conveyor 6 to the receiving surface 15 comprises the following steps:

the conveying of the object 7 in the direction of conveying, the object resting by its base 7a on the conveying surface 9, putting the object 7 into contact with the guide 16, ending the contact between the base 7a of the object and the conveying surface 9, dropping the object 7 onto the receiving surface 15.

Dropping is defined here as the weight being the main force that is exerted on the object 7, so that a center of gravity $G$ of the object describes, during the dropping step, an essentially straight trajectory in a downward vertical direction.

The step for ending the contact between the base 7a of the object and the conveying surface 9 takes place only after the step of putting the object 7 into contact with the guide 16.

Thus, thanks to the guide 16, the object 7 to be transferred arrives on the receiving surface 15 in balance position, on its base 7a. Thus, the object 7 maintains its orientation before and after transfer, i.e., while resting on its base 7a.

For example, the method can involve a step for destabilizing the object 7.

Represented in FIGS. 6 to 10 are the various steps of the transfer method with a destabilizing of the object 7. For illustrative purposes, we have put a broken line going through a center of gravity G of the object, the line being vertical in FIGS. 5 and 6, when the object 7 rests on the main portion 13, at the time horizontal, of the conveying surface 9.

Figure 6:
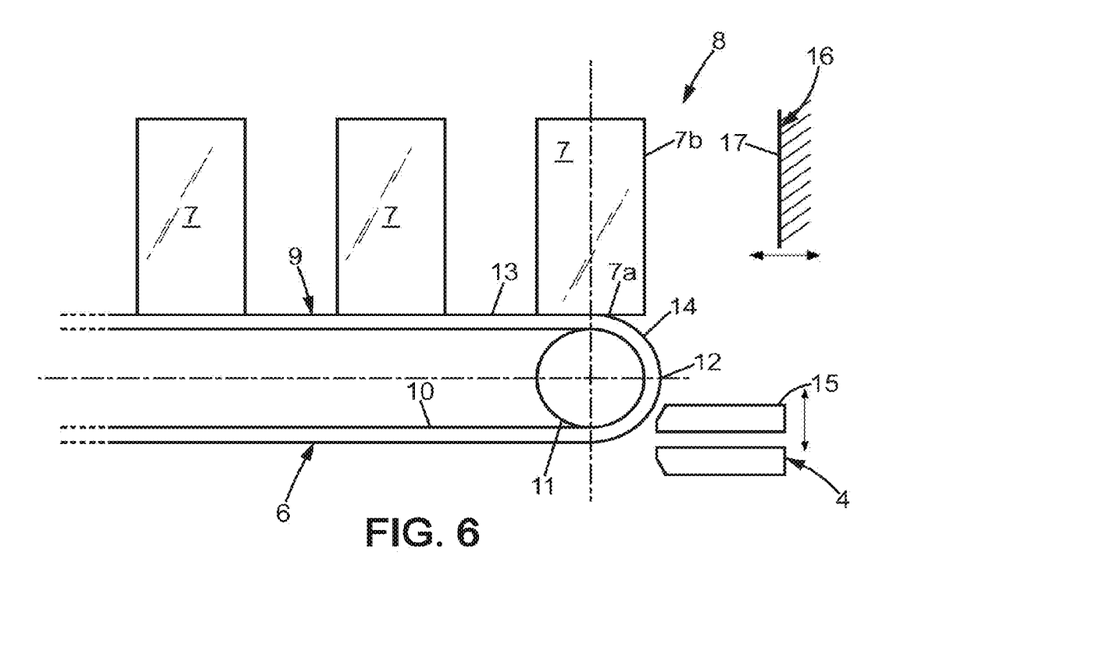
FIGS. 6 to 10 are diagrammatic representations of the various steps for transferring an object according to an embodiment, by means of a transferring system according to the invention.
Figure 7:
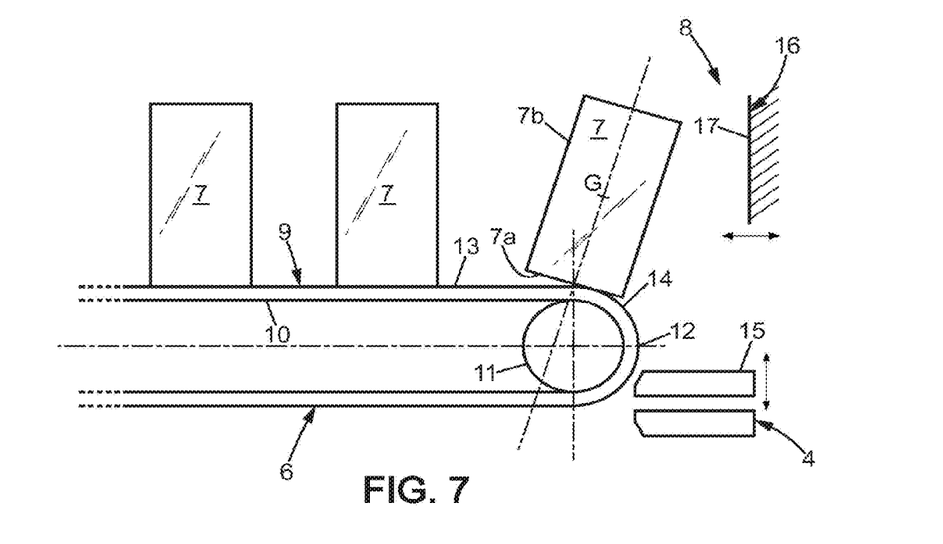

First of all, the object 7 on the conveying surface 9 approaches the inclined portion 14 to the point where the center of gravity G is aligned vertically with the point at the junction between the main portion 13 and the inclined portion 14 (FIG. 6). When the center of gravity G of the object 7 goes beyond the point at the junction between the main portion 13 and the inclined portion 14 of the conveying surface 9 (FIG. 7), the object 7 leaves its balance position and pivots around the transverse horizontal direction. The base 7a is always in contact with the conveying surface 9, on the inclined portion 14. The object 7 is then destabilized.

Figure 8:
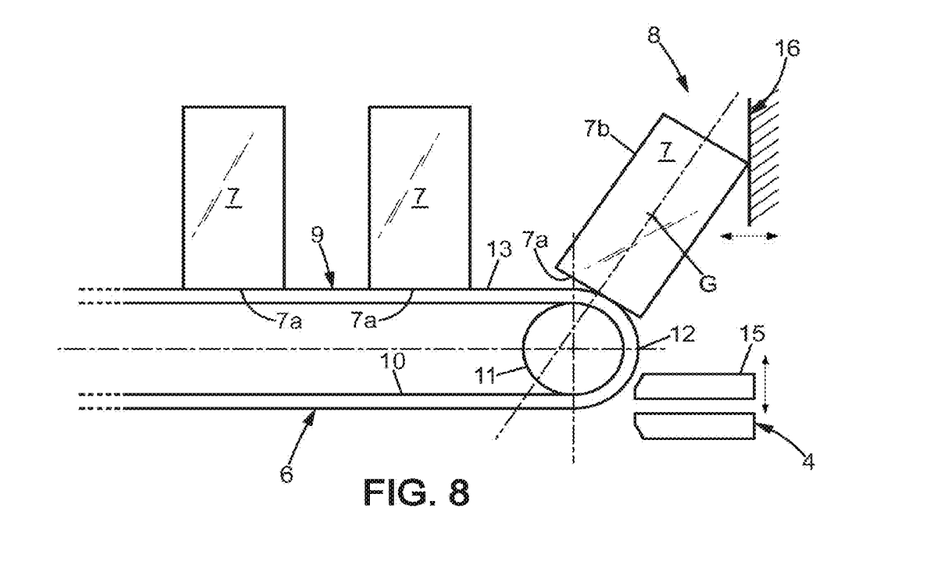

The pivoting of the object 7 thus destabilized takes place in a first direction, until contact is made with the guide 16 (FIG. 8). The guide 16 is then advantageously placed such that the contact with the object 7 is made above the center of gravity G of the object 7.

However, it is conceivable that the object 7 is not destabilized, but that the pivoting in the first direction is simply the consequence of the inclination of the inclined portion 14 of the conveying surface 9.

Once the contact with the guide 16 takes place, the object 7 is still pivoting around the transverse horizontal direction, but in a second direction, opposite the first, such that the object is righted. This second pivoting can, for example, be triggered by the continuous movement of the supply conveyor. Actually, since the base 7a of the object is still in contact with the conveying surface 9 (FIG. 9), the conveying surface 9 pushes on the base 7a of the object 7 in the direction of conveying, causing the second pivoting. Accordingly, the friction coefficient between the base 7a of the object and the conveying surface 9 is designed so that there is no sliding between the object 7 and the conveying surface 9.

Figure 9:
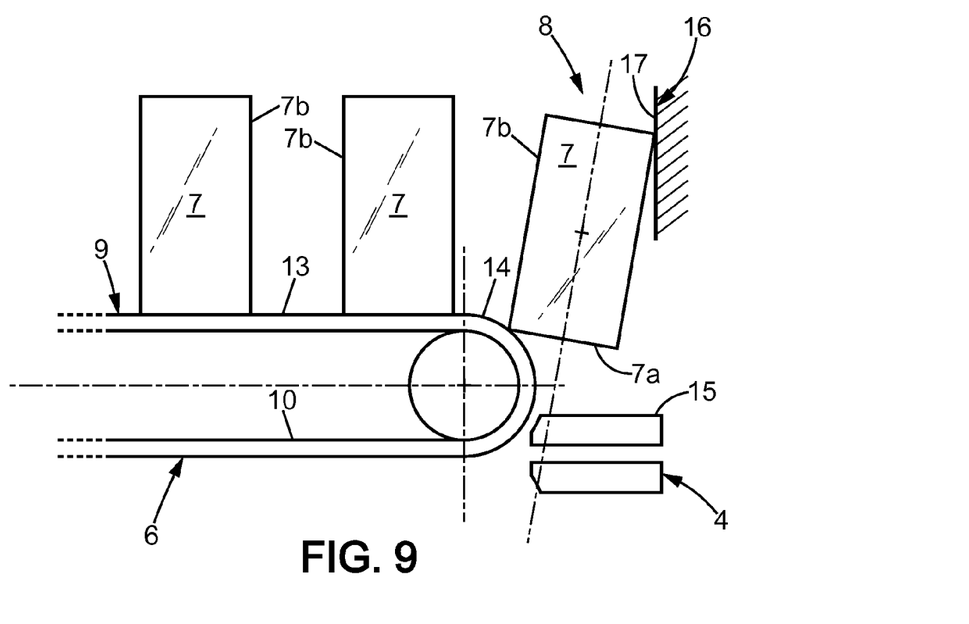

Once the contact with the guide 16 is achieved and the righting of the object 7 is at least begun, i.e., the object has at least begun to pivot in the second direction, the contact between the base 7a and the conveying surface 9 can be ended.

Figure 10:
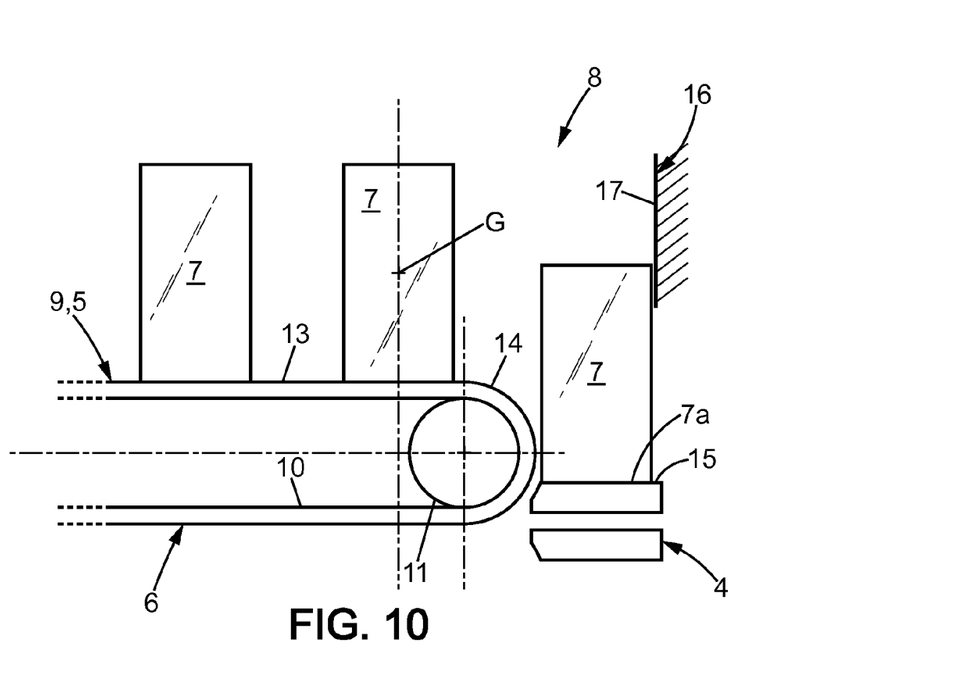

The object 7 then no longer rests on the conveying surface 9 and can fall, in the dropping step, under the effect of its own weight, onto the receiving surface 15. Since the object 7 has been righted, it is then very close to its balance position. Thus, the object 7 arrives by its base 7a on the receiving surface 15, on which it can rest by its base 7a in balance position (FIG. 10).

Alternatively, during the step for ending the contact between the base 7a of the object 7 and the conveying surface 9 and during at least a portion of the dropping step, and preferably during the entire dropping step, of the object 7 onto the receiving surface 15, the contact between the object 7 and the guide 16 is maintained. Thus, when the object has a body 7b that is approximately perpendicular to the base 7a, the body 7b of the object slides along the guide 16, ensuring the object 7's being placed in balance position, and being kept in the balance position, before the placing in contact on the receiving surface 15.

The distance between the guide 16, more specifically the front face 17, and the end line 12 is determined as a function of the dimensions of the object 7 to be transferred, so that the object 7 can rest by its base 7a on the receiving surface 15 between the end line 12 and the guide 16, while making possible the step for putting the object 7 into contact with the guide while the base 7a of the object 7 is still in contact with the conveying surface 9. Thus, it has been determined that by installing the guide 16, and more specifically the front face 17, at a distance from the downstream end line that corresponds, aside from play, to a dimension of the object 7, in the longitudinal horizontal direction, the desired result is attained.

Consequently, the transferring system 8 comprises means for adjustments, not shown in the figures, to adjust the distance between the guide 16 and the end line 12. The position of the guide is then maintained when the transferring system 8 is operating.

Advantageously, the object 7 on the receiving surface 15 is then removed. According to the embodiment that is preferred and illustrated in the figures, the removal takes place by conveying on the output conveyor 4. In a first variant, the output conveyor 4 is operating when the object 7 is received, so that the removal takes place immediately after contact on the receiving surface 15. In a second variant, the output conveyor 4 is stopped when the object 7 is received on the receiving surface 15. Then, the output conveyor 4 is put into operation during the removal of the object 7. The first variant makes it possible to obtain very high rates of speed. The second variant makes it possible to ensure the stability of the object on the receiving surface 15 before the removal.

Preferably, and especially when the receiving surface 15 is carried by the output conveyor 4 operating during the receiving of the object 7, the object 7 enters into contact with the receiving surface 15 only at the end of the dropping step, so that the pivoting of the object 7 is not affected by the receiving surface 15.

Accordingly, the transferring system 8 comprises means, not shown in the figures, to adjust the position of the receiving surface 15 in relation to the main portion 13 of the conveying surface 9, as a function of the dimensions of the object 7 to be transferred, to prevent contact between the object 7 and the receiving surface 15 before the dropping step. The position of the receiving surface 15 is then maintained when the system 8 is operating.

The method and the transferring system 8 thus make it possible to perform the transfer of the objects rapidly, at rates suited to the requirements of the industry, while keeping the objects 7 in the same position, resting on their base 7a, before and after transfer.

Furthermore, the objects 7 drop onto the receiving surface 15 under the effect of their own weight and no longer under the effect of the pushing of the objects that follow them onto the conveying surface 9. Consequently, the transferring method is particularly well suited to the transferring of a row 18 of objects 7. The row 18 extends in a transverse direction, perpendicular to the direction of conveying of the supply conveyor 6, and the steps of the method are performed preferably simultaneously for all of the objects 7 of the row 18.

Thus, several rows 18 can be placed on the conveying surface 9 of the supply conveyor 6. The distance between the rows 18 is determined so that the step for dropping the objects of one row 18 takes place only after the complete removal of the objects 7 of a previously transferred row 18. Accordingly, the means making it possible to ensure the transfer from the input conveyor 2 onto the accumulation surface 5 are synchronized with the speed of the supply conveyor 6 to obtain a predetermined separation between the rows on the accumulation surface 5.

In this, the guide 16, and more specifically its front face 17, extends over a transverse horizontal dimension that is approximately equal to the length of the rows 18, so that the guide extends facing the group of the objects 7 of the row 18.

According to one embodiment, the objects 7 to be transferred have a height and a weight such that during the step for ending the contact between the base 7a of the object 7 and the conveying surface 9, i.e., during the second pivoting, it is necessary to stop the pivoting of the object 7. Actually, under the effect of the pushing of the supply conveyor 6, the kinetic energy supplied to the object 7 can cause the exceeding of the balance position during the second pivoting. In this case, if the guide 16 is too short, i.e., if the distance in the vertical direction between the guide 16 and the receiving surface 15 is too small, the object 7 can, during the second pivoting, go under the guide 16 and not arrive in balance position on the receiving surface 15.

Figure 11:
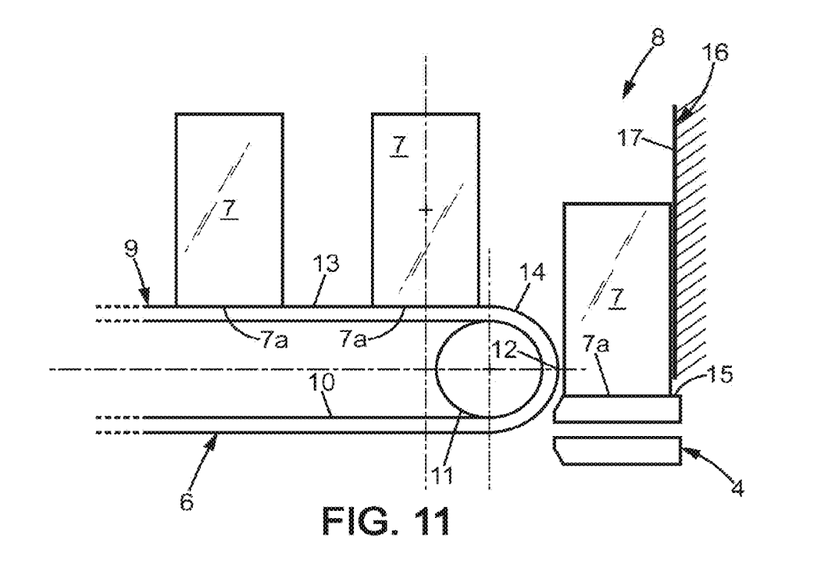
FIG. 11 is a diagrammatic representation of a first variant of the system of FIGS. 6 to 10, FIGS. 12 to 14 are diagrammatic representations of the various steps for transferring an object according to an embodiment, by means of a transferring system according to the invention, in a second variant, for bottle-type objects.

To solve this problem, the guide 16 can be extended vertically until it is closer to the receiving surface 15. Thus, a lower portion of the object, i.e., the portion of the body 7b of the object 7 near the base 7a, abuts against the guide 16 during the second pivoting and slides along the front face 17 of the guide 16 during the dropping to arrive in stable position on the receiving surface 15.

As indicated previously, the guide 16 can comprise a plurality of plates forming the front face 17. In a particularly advantageous manner, the guide 16 comprises two portions: a portion 16a for retaining and a portion 16b for positioning. The retaining portion 16a is placed above, in the vertical direction, the positioning portion 16b, which is then closer to the receiving surface 15. The means to adjust the distance between the guide 16 and the downstream end line 12 can then adjust the position of the portions independently of one another, or as a unit.

In the case of approximately cube-shaped objects, the two portions, respectively 16a, 16b, of the guide 16 each have a front face, respectively 17a, 17b, which is coplanar between them. The retaining portion 16a ensures contact with the object during the step for ensuring contact with the guide 16, while the portion 16b stops the second pivoting of the object 7 during the step for ending contact between the base 7a of the object 7 and the conveying surface 9 and the dropping step, ensuring that the object 7 arrives in balance position on the receiving surface 15.

In the case where the objects 7 are not cube-shaped, the front faces, respectively 17a, 17b, of the portions, respectively 16a, 16b, of the guide 16 are not coplanar, but are offset in relation to one another in the longitudinal horizontal direction.

Figure 12:
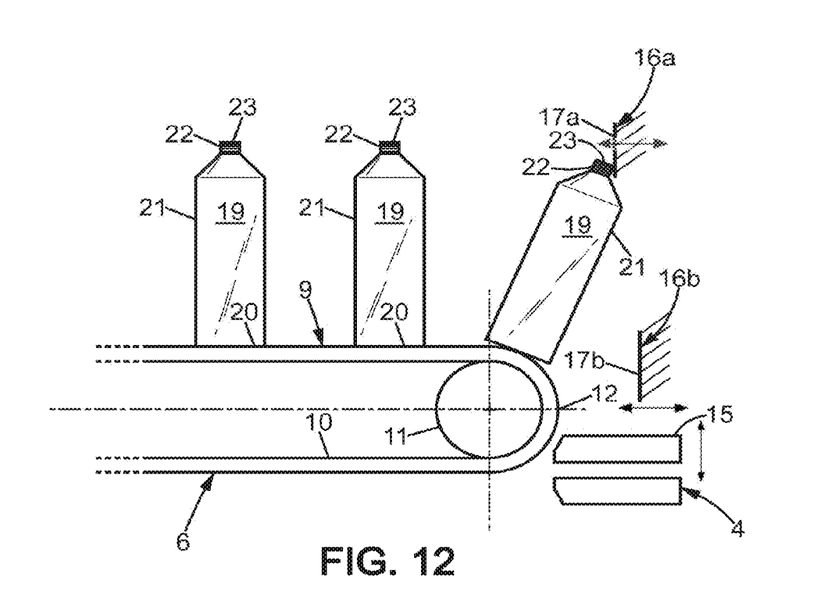
Figure 13:
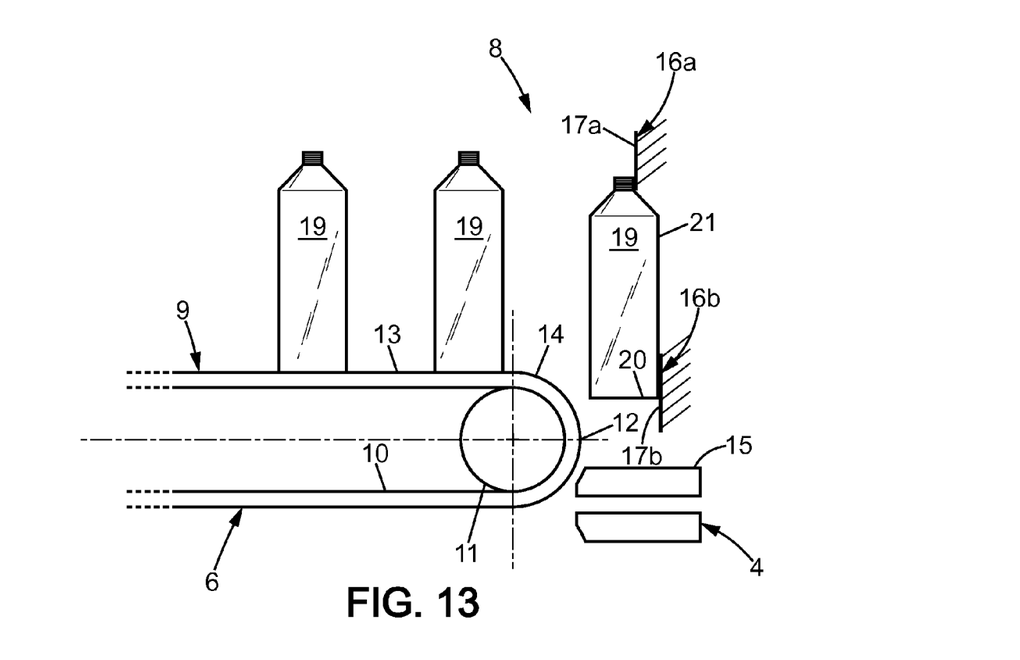
Figure 14:
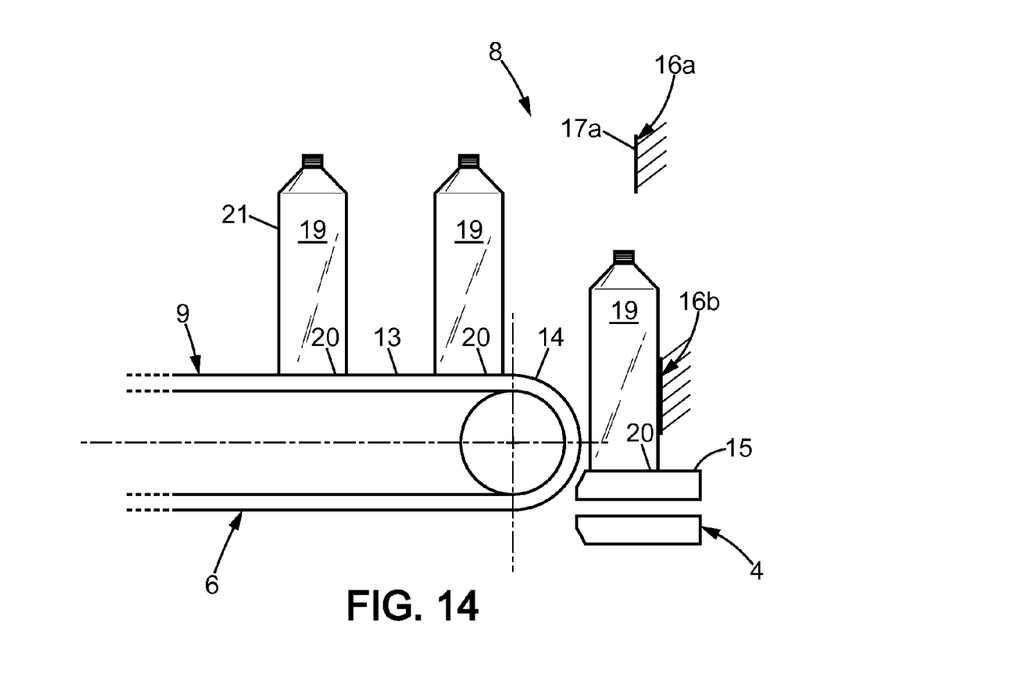

For example, according to a particular application illustrated in FIGS. 12 to 14, the objects 7 to be transferred are bottles 19. Generally, a bottle is not a cube-shaped object and comprises a bottom 20, which performs the function of base here, an approximately cylindrical body 21 extending perpendicular to the bottom 20, a neck 22 having a smaller cross-section than the body, and attached to the body 21 by a shoulder, and a rim 23, covered by a cap, not shown. The height of the bottle 19 measured between the bottom 20 and the rim 23 is greater than the width measured on its bottom 20.

The two portions 16a, 16b of the guide 16 are then offset in relation to one another in the horizontal longitudinal direction. More specifically, the front faces, respectively 17a, 17b, of the portions, respectively 16a, 16b, are not coplanar, in the same vertical plane, the face 17a of the retaining portion 16a being closer to the downstream end line 12 than the positioning portion 16b.

Thus, in the plane of FIGS. 12 to 14, which is vertical and parallel to the longitudinal horizontal direction, the distance, in the longitudinal horizontal direction between the downstream end line 12 and the retaining portion 16a, corresponds, aside from play, to a dimension in the longitudinal horizontal direction of the object 7 measured between a point on the body 21 and a point on the neck 22, opposite the point of the body in relation to a central axis of the bottle 19, so that the bottle 19 can be received between the downstream end line 12 and the portion 16a of the guide, in the area of its neck 22.

Likewise, in the same plane as above, the distance in the longitudinal horizontal direction between the downstream end line 12 and the positioning portion 16b corresponds, aside from play, to a dimension in the longitudinal horizontal direction of the object 7 measured between two points that are opposite, in relation to the central axis of the bottle 19, on the body 21, so that the bottle 19 can be received between the downstream end line 12 and the portion 16a of the guide, in the area of its body 21.

Thus, during the step for ensuring contact (FIG. 12), the rim 23 of the bottle 19 comes into contact with the front face 17a of the retaining portion 16a. Then, the body 21 of the bottle presses on the front face 17b of the positioning portion 16b during the second pivoting to stop it and to put the bottle 19 into balance position (FIG. 13) before being received on the receiving surface 15 (FIG. 14).

Of course, since the position of the guide 16 and of its portions 16a, 16b are adjustable, the configuration that has just been described can be adapted to the dimensions and to the shape of the objects to be transferred.

The invention claimed is:

1. A method for transferring at least one object (7) from a conveying surface (9) of a supply conveyor (6) to a receiving surface (15) that is adjacent to a downstream end line (12) of the supply conveyor (6) in the direction of conveying, the receiving surface (15) being offset from the conveying surface (9) downward in a vertical direction, the method comprising the following steps:

conveying the object (7) in an upright orientation and in a direction of conveying, the object (7) comprising a base (7a) that rests on the conveying surface (9) so that the object (7) is upright;

putting the object (7) into contact with a guide (16) placed in the direction of conveying at a distance from the downstream end line (12) of the supply conveyor (6);

ending the contact between the base (7a) of the object and the conveying surface (9); and dropping the object (7) onto the receiving surface (15), the step for ending the contact between the base (7a) of the object (7) and the conveying surface (9) taking place only after the step of putting the object (7) into contact with the guide (16).

2. The method according to claim 1, wherein during the step for ending the contact between the base (7a) of the object and the conveying surface (9) and during the step of dropping the object (7) onto the receiving surface (15), the contact between the object (7) and the guide (16) is maintained.

3. The method according to claim 2, further comprising: a step of removing the object (7) from the receiving surface (15).

4. The method according to claim 2, further comprising: a step of destabilizing the object (7) on the conveying surface (9) before the step for ensuring contact with the guide (16), the guide (16) being placed so that when the object (7) is put into contact with the guide (16), the guide (16) is above a center of gravity (G) of the object (7).

5. The method according to claim 2, wherein the row (18) extends in a transverse direction, perpendicular to the direction of conveying of the supply conveyor (6), the steps of the method being performed simultaneously for all of the objects (7) of the row (18).

6. The method according to claim 1, further comprising: a step of removing the object (7) from the receiving surface (15).

7. The method according to claim 6, wherein in which the receiving surface (15) is carried by an output conveyor (4), the output conveyor (4) being stopped when the object (7) is received on the receiving surface (15), then being in operation during the removal of the object (7).

8. The method according to claim 6, wherein the receiving surface (15) is carried by an output conveyor (4), the output conveyor (4) being in operation when the object (7) is received on the receiving surface (15).

9. The method according to claim 1, further comprising: a step of destabilizing the object (7) on the conveying surface (9) before the step for ensuring contact with the guide (16), the guide (16) being placed so that when the object (7) is put into contact with the guide (16), the guide (16) is above a center of gravity (G) of the object (7).

10. The method according to claim 1, wherein a row (18) containing a plurality of objects (7) is transferred, the row (18) extending in a transverse direction, perpendicular to the direction of conveying of the supply conveyor (6), the steps of the method being performed simultaneously for all of the objects (7) of the row (18).

11. The method according to claim 10, wherein several rows (18) are placed on the conveying surface (9) of the supply conveyor (6), the distance between the rows (18) being determined so that the step for dropping a row (18) of objects (7) takes place only after a step for removal of the row (18) of objects (7) previously transferred onto the receiving surface (15).

12. A system (8) for transferring at least one object (7) from a conveying surface (9) onto a receiving surface (15), the system (8) comprising:
a supply conveyor (6) carrying the conveying surface (9), the object (7) resting in an upright orientation where a base (7a) of the object is in contact with the conveying surface (9), the conveying surface (9) having a main portion (13) that extends in a direction of conveying, and an inclined portion (14) in an extension downstream from the main portion (13) in the direction of conveying,
the inclined portion (14) being inclined, in relation to the direction of conveying, downward in a vertical direction,
the receiving surface (15) being adjacent in the conveying direction to a downstream end line (12) of the supply conveyor (6),
the object (7) resting by its base (7a) on the receiving surface (15), and
the receiving surface (15) being offset from the conveying surface (9) downward in the vertical direction; and
at least one guide (16), located at a distance in the direction of conveying from the end line (12) of the supply conveyor (6) and having a surface (17) that is fixed with respect to a remainder of the guide (16), the receiving surface (15) then extending at least partially in the longitudinal direction between the end line (12) and the guide (16),
wherein a distance between the guide (16) and the downstream end line (12) of the supply conveyor (6) is adjustable and the position of the receiving surface (15) in relation to the main portion (13) of the conveying surface (9) is also adjustable so that, in operation, the object (7), in the upright orientation, is brought by the conveying surface (9) into contact with the guide (16), the contact between the base (7a) of the object and the conveying surface (9) ends only after the object comes into contact with the guide (16), and the object (7) subsequently falls onto the receiving surface (15) in the upright orientation.

13. The system (8) according to claim 12, wherein the receiving surface (15) is carried by an output conveyor (4) whose direction of conveying is perpendicular to the direction of conveying of the supply conveyor (6).

14. The transferring system (8) according to claim 13, wherein the guide (16) comprises two portions, a first so-called retaining portion (16a) being located above the center of gravity (G) of the object (7) when the object (7) rests on the conveying surface (9) and a second so-called positioning portion (16b) being located closer to the receiving surface (15) in the vertical direction than the retaining portion (16a).

15. The transferring system (8) according to claim 13, wherein the supply conveyor (6) is able to convey at least one row (18) of objects (7), which extends in a transverse direction to the direction of conveying, onto the receiving surface (15), the guide (16) then extending in the transverse direction, over a dimension corresponding at least to the transverse length of the at least one row (18) of objects.

16. The transferring system (8) according to claim 13, wherein the supply conveyor (6) is a conveyor of an accumulator (3) between an input conveyor (2) conveying objects (7) at the output of an upstream machine (M1), and an output conveyor (4) conveying objects (7) up to the input of a downstream machine (M2).

17. The transferring system (8) according to claim 12, wherein the guide (16) comprises two portions, a first so-called retaining portion (16a) being located above the center of gravity (G) of the object (7) when the object (7) rests on the conveying surface (9) and a second so-called positioning portion (16b) being located closer to the receiving surface (15) in the vertical direction than the retaining portion (16a).

18. The transferring system (8) according to claim 12, wherein the supply conveyor (6) is able to convey at least one row (18) of objects (7), which extends in a transverse direction to the direction of conveying, onto the receiving surface (15), the guide (16) then extending in the transverse direction, over a dimension corresponding at least to the transverse length of the at least one row (18) of objects.

19. The transferring system (8) according to claim 12, wherein the supply conveyor (6) is a conveyor of an accumulator (3) between an input conveyor (2) conveying objects (7) at the output of an upstream machine (M1), and an output conveyor (4) conveying objects (7) up to the input of a downstream machine (M2).

20. The transferring system (8) according to claim 12, wherein the supply conveyor (6) is an endless belt conveyor (10) that is wound around at least one downstream drum (11) carrying the downstream end line (12) of the supply conveyor (6).

\* \* \* \* \*